Aug. 10, 1937.  R. CROSS  2,089,691
METHOD AND APPARATUS FOR TRANSPORTING VISCOUS LIQUIDS
Filed April 4, 1934
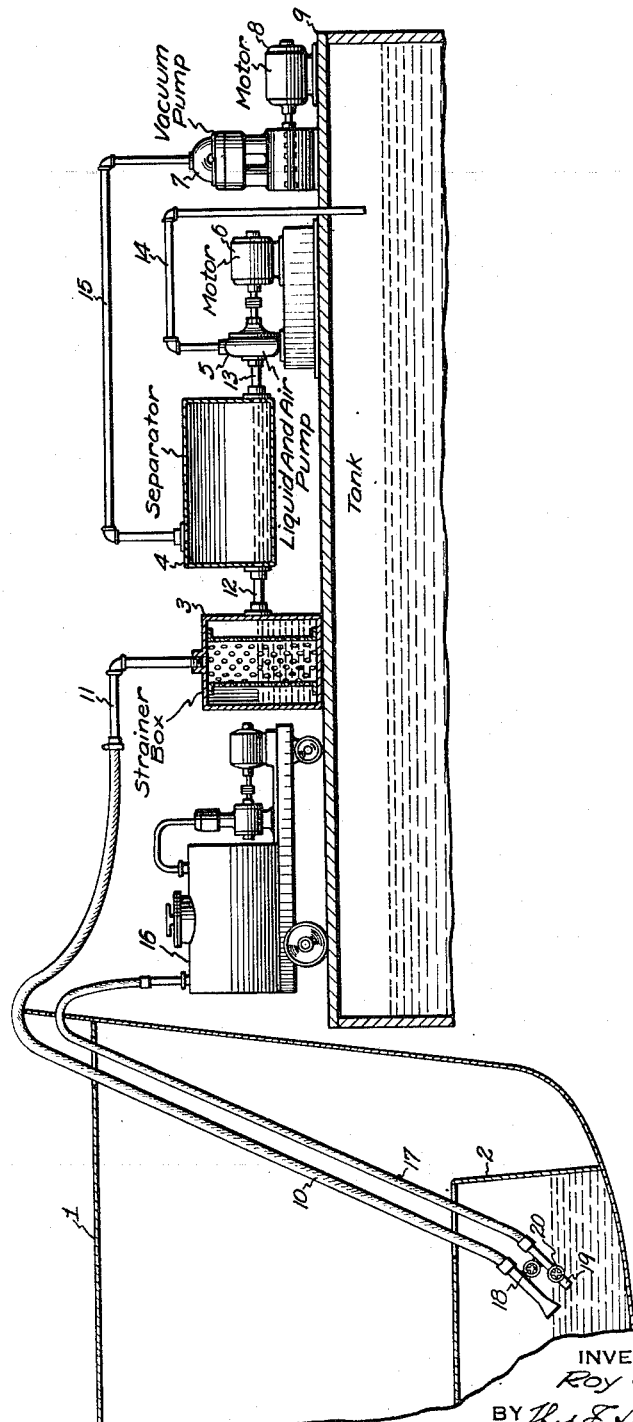
INVENTOR
Roy Cross
BY Thos. E. Scofield
ATTORNEY Patented Aug. 10, 1937

2,089,691

UNITED STATES PATENT OFFICE 2,089,691

METHOD AND APPARATUS FOR TRANSPORTING VISCOUS LIQUIDS

Roy Cross, Kansas City, Mo., assignor to Salvage Process Corporation, New York, N. Y., a corporation of New York Application April 4, 1934, Serial No. 719,049

2 Claims. (Cl. 103—5)

This invention relates to improvements in a method and apparatus for transporting viscous liquids and refers more particularly to a method for transferring heavy sludge or bottom settlings which accumulate in oil tanks of oil burning ships. This sludge which settles and accumulates in the oil bunkers, builds up over a period of time to form a thick, greasy mass having a jellylike consistency. It is extremely difficult to remove, particularly in cold weather. The common practice heretofore has been to dig out this sludge by means of shovels and buckets or to steam out the compartment, thereby supplying sufficient heat to render the mass sufficiently fluid so that it can be satisfactorily handled. The practice of manually removing the material is extremely slow, costly, and unsatisfactory, due to the fact that it necessitates the continual handling of a large quantity of greasy dirt. The accumulation or sludge is of such a nature as to preclude its being handled by a force pump as the height of the lift from the ship's bunkers over the ship's side is usually from 30 to 50 feet or greater and therefore it is impractical to remove the material by any ordinary suction pumping operation.

This invention is an improvement over U. S. patent to Walter M. Cross 1,883,594, U. S. patents to H. J. Wheeler 1,405,173 and 1,480,482, and U. S. patent to G. Engstrand 1,544,076.

The salient feature of the present invention is to provide a method in which the heavy sludge is removed by high vacuum and the introduction of air with the sludge in order to produce an air-oil emulsion or dispersion throughout the transfer line which may be a hose or pipe, and the use of an emulsifying agent or detergent in the form of a chemical having a detergent action which will serve to increase the dispersion of the oil in the air and function also as a cleansing and lubricating agent. The present method differs also from the practice described in the above mentioned patents in that the sludge is continually removed from the separating stage, while heretofore the sludge was permitted to cool in the vacuum or separating stage and thereafter, at intervals, when the vacuum or separating stage was cut out of the system, the sludge was drawn off by means of a withdrawal pump. The present improvement of introducing a detergent or emulsifier to the nozzle end of the sludge withdrawal pipe may be used as well with either type of system, either where the oil is continuously withdrawn from the separator or intermittently drawn when the separator is cut out of the system. The intermittent operation requires two separator tanks which are alternately used while the other is being cleaned of its sludge accumulation.

The single figure is a diagrammatic view of the apparatus with parts shown in section.

Referring to the drawing, at 1 is shown a portion of a ship equipped with oil bunkers or tanks 2. 3 is a strainer box; 4 is a separator tank which may take the form of an enlarged manifold or tank such as that shown; 5 is the liquid and air discharging pump driven by motor 6; 7 is a vacuum pump driven by motor 8, and 9 is a tank or barge into which the sludge is discharged.

The operation is as follows. The vacuum pump 7 and the liquid discharge pump 5 are started to exhaust the tank 4 in which a high vacuum is built up. This vacuum is created not only upon the separating stage 4 but also upon the strainer box and the suction house 10. This suction hose is held by an operator at the surface of the sludge in the tank and the oil and air are permitted to enter simultaneously into the suction hose at high velocity. The vacuum pump 7 and the liquid discharge pump 6 are capable of maintaining a vacuum as high as 25 inches of mercury, or higher. This vacuum whips the oil and air into the suction hose, breaking up the oil into relatively small particles which are carried along with the air in suspension. Simultaneously there is introduced at the nozzle from the tank 16 by means of a hose connection 17 regulated by valve 18, an emulsifying agent or detergent which serves to produce a higher degree of emulsification of the oil particles and to cleanse and lubricate the inside of the suction hose of particles of oil and sludge which tend to accumulate and collect upon the interior of the hose. This cleansing or lubricating action furnished by the detergent greatly reduces the requirements which are put upon the vacuum pump and eliminates stoppage in the suction hose sometimes occasioned by accumulations of the sludge during cold weather. It is recognized that steam has been used to increase and augment the dispersion of the sludge as it enters the suction hose and, if temperature conditions are not such that heating of the oil is desired, steam may be used as a supplementary agent in the present invention. A separate nozzle 19 regulated by valve 20 permits the jetting of detergent directly into the tank bottom or onto the surface of the deeper oil where it may be picked up with the oil by the vacuum in the suction hose.

Among the detergents which have been found satisfactory are soaps in general, such as oleates, palmitates, stearates, and linolates of potassium and sodium. Silicate of soda, borax, carbonate of soda, and hydrous aluminum silicates having gelatinizing properties when combined with water may be used with good results. Sulphonated oils have proved effective as detergents or when used in combination with some of the material suggested above. There may be placed, if desired, at intervals in the suction line, traps which would serve to distribute the detergent and maintain a better emulsion of the liquid and gaseous components.

Small quantities of the detergent are required to produce proper lubrication and emulsifying action. Possibly 0.1%, based on the amount of liquid to be removed, will suffice under normal conditions. If salt water is present, the use of sulphonated oil such as sulphonated castor oil, will improve the action of the detergent as it forms a suds in the presence of brine or lime and magnesia salts, while some of the other detergents are acted on adversely by the presence of salt water. Detergents or emulsifying materials preferably introduced in liquid condition also have a very pronounced effect in preserving the oil and preventing corrosion in the hose connection, tanks and other metal surfaces of the apparatus.

Returning to the operation, the oil, air and detergent mixture proceeds at high velocity through the suction hose and is carried from the ship's side through the suction pipe 10 and connection 11 into the strainer box 3. In the strainer box, any foreign materials such as nuts, bolts, or pieces of wood, iron or solid objects of any kind which have been picked up in the ship's bottom, are separated out and the oil drawn through the pipe 12 into the separating stage 4. While in the drawing a tank has been shown, it is only necessary to have sufficient space in the separating zone to permit the separation of oil and air, and this separation takes place rather easily due to the difference in gravity of the constituents of the air-oil mixture under the vacuum conditions at which the separator is maintained. The oil accumulating in the separating zone is drawn off through the pipe 13 which connects with the suction side of the air pump 5. By means of this pump, the liquid is discharged through the line 14 into the tank 9. From the top of the separator 4 is a connection 15, communicating with the suction side of the vacuum pump 7. The discharge of the vacuum pump may be exhausted into the atmosphere or into the air space of the tank 9 as this exhaust may, at times, contain a fog of oil due to improper separation of the oil and air in the separator. The vacuum pump 7 and the liquid and air pump 5 are operated continuously so that air is discharged to the vacuum pump while both air and oil are discharged to the liquid-air pump. The capacity of the pumps 5 and 7 is sufficient to maintain upon the system and upon the suction end of the hose 10 proper vacuum conditions to raise the emulsion or dispersion of air and sludge, from the ship's bunkers over the side of the ship into the containers used for collection of the sludge, although the nozzle of the suction hose is only partially immersed in the oil, while the sludge is being removed.

While the invention has been described with reference to the removal of accumulations of sludge or bottom settlings in the bunkers or tanks of oil burning ships, it is contemplated that the process may be used for the transportation of any viscous liquid such as molasses, heavy oils or any other materials of this nature.

Having thus described my invention, what I claim is:

1. A method of transporting a body of viscous liquid, including the steps of creating a partial vacuum in an elongated passageway communicating with a separating zone, permitting atmospheric pressure to force air through said passageway to said separating zone, positioning the entrance to said passageway at the surface of the body of the viscous liquid to be transported, supplying a detergent emulsification agent to said liquid in the region of said entrance, allowing the air flowing into said passageway to form an emulsion or mixture with said liquid and said emulsification agent whereby said mixture will flow to said separating zone, and continuously and separately withdrawing the air and the liquid components of the mixture from said separating zone to maintain the partial vacuum.

2. A method of transporting viscous liquids including the steps of creating a partial vacuum in an elongated passageway, permitting atmospheric pressure to force air through said passageway, positioning the entrance to said passageway at the surface of the viscous liquid to be transported, supplying a detergent emulsification agent to said liquid in the region of said entrance, allowing the air flowing into said passageway to form an emulsion or mixture with said liquid and said emulsification agent whereby said mixture will flow through said elongated passageway, and continuously withdrawing the air and liquid components of said mixture from said elongated passageway to maintain the partial vacuum.

ROY CROSS.